Sept. 29, 1936. C. H. DENNIS 2,055,521
RAKE
Filed April 20, 1931
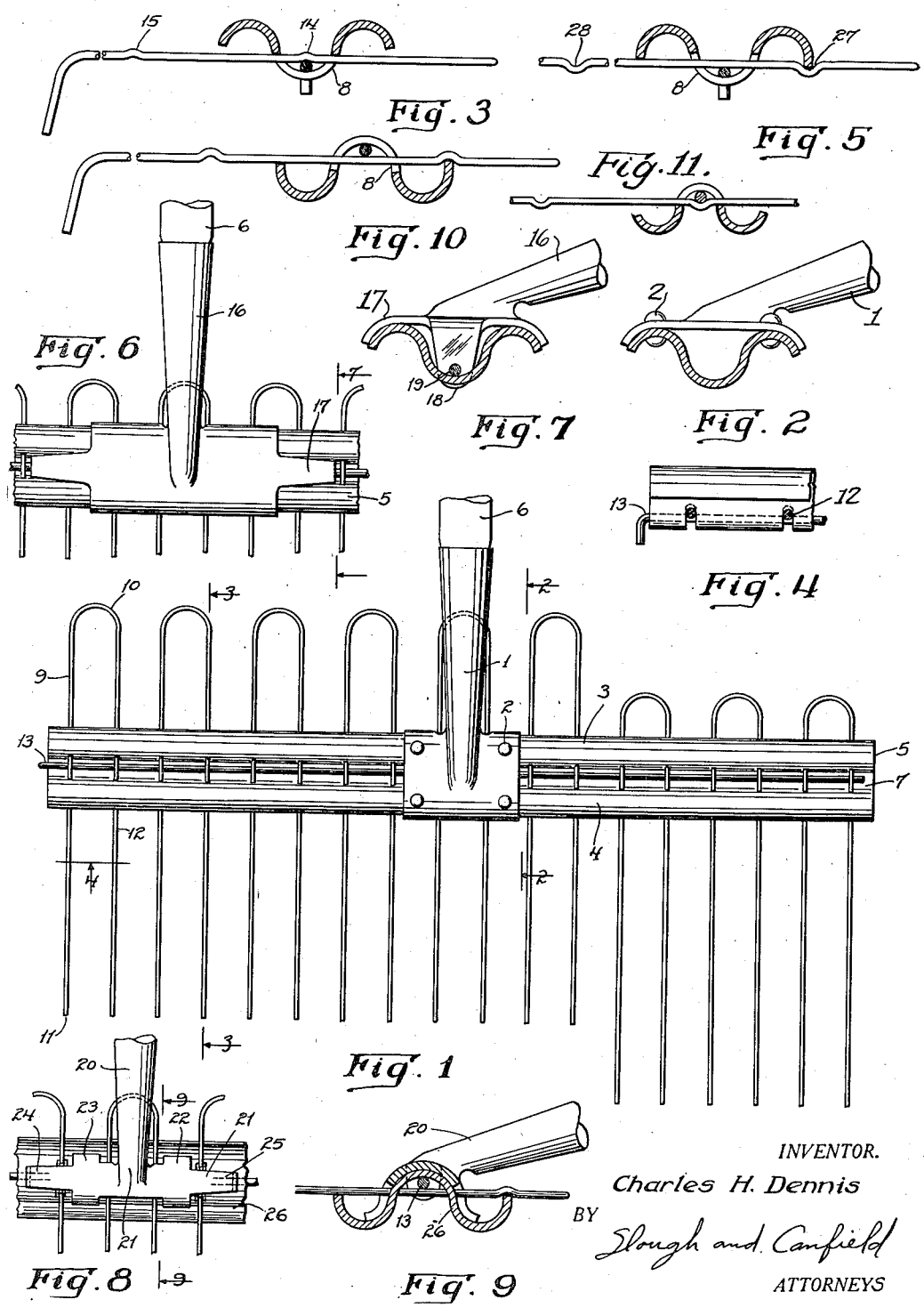
INVENTOR.
Charles H. Dennis
BY
Slough and Canfield
ATTORNEYS Patented Sept. 29, 1936

2,055,521

UNITED STATES PATENT OFFICE 2,055,521

RAKE

Charles H. Dennis, Jackson, Mich., assignor to The American Fork & Hoe Company, Cleveland, Ohio, a corporation of Ohio Application April 20, 1931, Serial No. 531,353

7 Claims. (Cl. 55—114)

My invention relates to rakes, and relates particularly to rakes of the lawn type.

An object of my invention is to provide a rake having flexible tines of adjustable length.

Another object of my invention is to provide a rake having adjustable tines which automatically lock in position when adjustably moved from one position to another, and whereby the degree of flexibility may be varied.

Another object of my invention is to provide a rake having tines which are not easily displaced during the normal use of the rake, but which are readily removable for replacement, if necessary.

Another object of my invention is to provide a rake which is efficient for a great variety of uses, such as raking soil under cultivation, for use as a lawn rake, or for collecting cinders, stone, grass, etc.

Another object of my invention is to provide a high grade rake of the above character which will be efficient in use, highly economical in manufacture, and adapted for quantity production.

Other objects of my invention and the invention itself will become apparent by reference to the following description of an embodiment of my invention, and in which description reference will be had to the accompanying drawing forming a part of my invention.

Referring to the drawing:

Fig. 1 is an elevational view of a rake which is an embodiment of my invention;

Fig. 2 is a cross-sectional view taken on the line 2—2 of Fig. 1, and showing the handle of the embodiment of Fig. 1;

Fig. 3 is a sectional view taken on the line 3—3 of Fig. 1, illustrating the tine in a certain locked position;

Fig. 4 is a sectional view taken on the line 4—4 of Fig. 1 illustrating in particular the locking key or wire passing under the hairpin tine of my invention;

Fig. 5 is a sectional view illustrating another method of locking engagement between the channel cross bar and the tine to hold the same securely in position;

Fig. 6 is a fragmentary elevational view of another embodiment of my invention;

Fig. 7 is a cross-sectional view of the handle of Fig. 6;

Fig. 8 is a fragmentary elevational view of another embodiment of my invention;

Fig. 9 is a cross-sectional view showing the handle of Fig. 8; and

Fig. 10 is a sectional view taken on the line 9—9 of Fig. 8.

Fig. 11 is a cross-sectional view of another embodiment of my invention illustrating the tine in a certain locked position.

Referring now to the different figures of drawing in all of which like parts are designated by like reference characters:

In Fig. 1, at 1 I show a rake handle socket preferably formed of forged sheet metal secured by rivets 2 to the front and rear flanges 3 and 4 of the channel cross head 5. Rivets 2 pass through aligned perforations in flanges 3 and 4 of the rake cross head to rigidly secure the handle socket to the said cross head. A handle 6 preferably of wood is inserted in and secured to the rake handle socket 1. The cross head 5 is in the form of a channel having front and rear flanges 3 and 4 respectively, and the web 7 of the channel cross head, 5, in the embodiment of Fig. 1, has a generally depressed concave surface and is provided with slots 8 disposed parallel to each other dividing the web 7 into a longitudinal series of loops or straps, and the generally U-shaped hairpin tines 9 are projected through the slots between the loops.

The tine elements 9 may be variably formed, but the preferred form in the drawing simulates the form of a wire hairpin of common type, being formed from steel wire bent midway at its ends as at 10 to a generally elongated U-form. The end portions forming tine prongs are curvilinearly bent so as to form down-turned terrene engaging ends 11. As best shown in Fig. 3, the tines 12 may be so bent as to lockingly engage a locking key or wire 13 in either one of two positions as illustrated at 14 and 15, or may be bent at spaced points as illustrated at 27 and 28 of Fig. 5 so that the tines may be adapted to engage the tip of the front or rear flange in locking position, as shown in Figs. 5, 9, and 10.

The locking key or wire 13 of my invention may be welded or down-turned at the end as best illustrated in Fig. 4 of the drawing.

In Fig. 6, I have shown another embodiment of my invention, in which embodiment I utilize a socket head 16 formed of sheet metal or the like having a generally elongated shaped neck portion, engaging the cross head 5 of my invention, provided with shoulders 17 projecting therefrom, and terminating in downward flanges 18, having their tip portions projected through perforations in the cross-head as illustrated in Fig. 7 and provided with perforations 19 therein through which the locking key or wire 13 passes.

This type of socket head requires no rivets or pins to hold the head securely in position. Otherwise, the rake shown in Fig. 6 is quite similar to the rake of Fig. 1.

In Fig. 8 I have shown an embodiment of my invention wherein not only a different type of socket head 20 is employed, but also a different shaped cross head is used. The socket head 20 of this embodiment of my invention comprises a substantially tubular neck 21 formed of a single piece of sheet metal having a pair of shoulders 22 and 23 terminating in a pair of oppositely disposed tongues 24 and 25 through which the locking key or wire 13 may pass.

The method of securing the socket head 20 illustrated in Fig. 8 to the cross-head 26 may be better understood by reference to Fig. 9 wherein the generally U-shaped shoulder 23 is shown seated upon the conformingly shaped axially extending portion of the cross-head with the downturned end of tongue 24 projected through a perforation provided therefor in the cross-head and secured to the cross-head by means of key 13. The tongue 25 is secured in a similar manner to the cross-head and thus the socket head is securely locked therewith.

Fig. 10 illustrates the method of securing the tines to the cross-head illustrated in Figs. 8 and 9, the tine portions which are bent at spaced points being adapted to selectively engage the upturned tips of the front or rear cross-head flange as desired. The tine of this modification is prevented from longitudinal displacement relative to the cross-head by engagement with the front or rear flange portions; whereas in the modification illustrated in Fig. 3, the tine is prevented from longitudinal displacement relative to the cross-head by engagement with the locking key.

The tines are formed of resilient wire and before assembling with the head, or after removing therefrom, the opposite legs thereof spread apart resiliently, considerably wider than that shown in Figs. 1, 6, or 9 of the drawing. Thus, when the tines have been inserted in the head as above described, the legs of the U tend resiliently to spread and thus the legs when brought into engagement with the aligned slots 8 securely hold the tines in position therein.

As shown in the drawing, the opposite flanges of the socket head plate in each of the embodiments of my invention preferably conform in shape to the front and rear flange of the channel cross head.

To insert the tines in the channel cross head, illustrated in Figs. 1 and 4, the legs 12 of each substantially U-shaped tine are projected through aligned slots 8 in the cross head. A locking key or wire 13 is now projected longitudinally of the cross head, passing under the tines and over the loops disposed parallel to each other. This key now interlocks with the projected vertically disposed tine legs at their bent portions 14 and the legs are allowed maximum flexibility.

The tines may be adjusted in the position shown in Fig. 3 to the position shown on the left of the cross head, illustrated in Fig. 1, to shorten the free resilient length of the legs, and to make them stiffer by adjustably moving the tines rearwardly through the slots in the head. The rearmost or extreme rearward adjustable position of the tines is illustrated in Fig. 3 at 15. When the bent portion 15 engages the locking key or wire 13, minimum flexibility of the tines is assured.

It will be understood, of course, that the tines may be adjusted to any position desired by bending the tine at any place therein. The combined action of the opening or spreading tendency of the tine and the locking engagement of the bent portion with the wire key will securely position and lock the tines in any position that may be chosen. In Fig. 5 there is shown an embodiment of my invention wherein I have contemplated bending the tine downwardly as illustrated at 27 and 28 respectively, and engaging therewith the end of one of the flanges 4 of the cross head 5. Figs. 9 and 10 utilize the cross head of Fig. 8 which is, briefly speaking, a reversal of the cross head 5 of Fig. 1, and necessarily, the bend in the wire tine must be upward to lockingly engage either of the flanges thereof.

Having thus described my invention in specific embodiments, I am aware that numerous and extensive departures may be made therefrom but without departing from the spirit of my invention.

I claim:—

1. In a rake, a cross head of channeled form having front and rear flange portions and an intermediate web portion, provided with transverse open notches, a plurality of rake tines, each seated by a mid portion in one of said notches, and a wire or rod disposed between said cross head flanges within the web portion thereof and said tines, and engaging the tines with deflecting pressure to restrain endwise removal thereof from said cross head, and a socket element for receiving a rake handle comprising a cross head engaging flange engaged with said cross head flanges, and means to prevent disengagement of said socket and cross head flanges, said last named means comprising downturned projections of said socket flange pierced to receive said wire or rod projected therethrough.

2. A rake comprising a sheet metal cross head, a plurality of longitudinally spaced loops on the head, a plurality of resilient rake tines having ground engaging portions extending transversely from the head and having each a body portion disposed between a pair of loops, and engaging the head on opposite transversely spaced portions thereof, a rod projected under the loops and over the tines reacting upon the loops and on the tines between said spaced portions, to secure the tines to the head, a rake handle socket provided with a cross head engaging portion and a pair of perforated lugs, the rod extending through the perforations to secure the socket to the head.

3. A rake comprising a sheet metal cross head, a plurality of longitudinally spaced loops on the head, a plurality of rake tines having body portions disposed each between a pair of loops, a rod projected under the loops and over the tines to secure the tines to the head, a rake handle socket provided with a cross head engaging portion and a perforated lug, the rod extending through the perforation to secure the socket to the head.

4. A rake comprising a cross head, a plurality of longitudinally spaced loops on the cross head, a plurality of resilient rake tines having a plurality of generally V-shaped portions disposed longitudinally of each tine and having each a body portion disposed between a pair of loops and engaging the head on opposite transversely spaced portions thereof, a rod projected between the loops and the tines reacting upon the loops and on the tines between said spaced portions to cause a slight resilient yielding of the tines between said spaced portions to effect frictional pressure engagement of a V portion of each tine with said spaced portions to normally prevent longitudinal displacement of the tines.

5. A rake comprising a sheet metal cross head, a plurality of longitudinally spaced loops on the cross head, a plurality of resilient rake tines having ground engaging portions extending transversely from the head and having each a substantially rectilinear body portion disposed between a pair of loops, and engaging the head on opposite transversely spaced portions thereof, the said body portion lying generally in a plane including the spaced portions and being provided with longitudinally spaced deformed portions, a rod projected over the loops and under the tines reacting upon the loops and on the tines between said spaced portions to cause a slight resilient yielding of the tines between said spaced portions to effect frictional pressure engagement of a deformed portion, each tine with said spaced portions to normally prevent longitudinal displacement of the tines.

6. A cross head comprising in cross section, a channel having the legs thereof terminating in laterally extending flanges, the channel being slotted to provide a series of longitudinally spaced loops, a plurality of resilient rake tines extending transversely of the cross head and having each a body portion disposed between the loops provided at longitudinally spaced points with flange gripping portions, a rod projected between the loops and the tines to normally prevent longitudinal displacement of the tines by causing pressive engagement of the tines with the cross head at points spaced transversely from the channel and the points of engagement of the tines with the rod and the cross head lying in a common plane.

7. A cross head comprising in cross section, a channel having the legs thereof terminating in laterally extending flanges being slotted to provide a series of longitudinally spaced loops, a plurality of resilient rake tines extending transversely of the cross head and having each a body portion disposed between the loops, a rod projected between the loops and the tines to normally prevent longitudinal displacement of the tines, and a socket removably secured to the cross head by portions engaging the rod.

CHARLES H. DENNIS.